(12) United States Patent
Lee et al.

(10) Patent No.: US 11,566,438 B2
(45) Date of Patent: Jan. 31, 2023

(54) MOBILITY HUB

(71) Applicants: HYUNDAI MOTOR COMPANY, Seoul (KR); KIA MOTORS CORPORATION, Seoul (KR)

(72) Inventors: Sueng Ho Lee, Seoul (KR); Sun Sung Kwon, Anyang-si (KR); Byung Hoon Yang, Seongnam-si (KR); Jeong Mo Jang, Yongin-si (KR); Kwang Hyun Won, Bucheon-si (KR); So Ra Roh, Jeonju-si (KR); Jae Wan Choi, Anyang-si (KR); Min Su Kim, Busan (KR); Yoh Han Kim, Seoul (KR); Ji Hwan Byun, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/185,596

(22) Filed: Feb. 25, 2021

(65) Prior Publication Data

US 2022/0112736 A1    Apr. 14, 2022

(30) Foreign Application Priority Data

Oct. 14, 2020    (KR) .................... 10-2020-0132712

(51) Int. Cl.
*E04H 6/22*    (2006.01)
(52) U.S. Cl.
CPC ..................... *E04H 6/22* (2013.01)

(58) Field of Classification Search
CPC .... E04H 6/22; E04H 6/00; E04H 6/08; E04H 6/12; E04H 6/18; E04H 6/182; E04H 6/42; E04H 6/44; B64F 1/326; B64F 1/222; B64F 1/324; B64F 1/368; B64F 1/28; E01F 3/00; B67D 7/04; B60S 5/02
See application file for complete search history.

(56) References Cited

U.S. PATENT DOCUMENTS

| | | | | |
|---|---|---|---|---|
| 2,481,343 | A * | 9/1949 | Redstone | E01F 7/025 244/114 R |
| 5,314,285 | A * | 5/1994 | Lai | E04H 6/22 414/236 |
| 11,142,924 | B1 * | 10/2021 | Cha | E04H 6/422 |
| 11,156,010 | B1 * | 10/2021 | Corban | B64D 5/00 |
| 2004/0237421 | A1 * | 12/2004 | Franz | E04H 6/28 52/79.1 |

(Continued)

FOREIGN PATENT DOCUMENTS

KR    20050110171 A    11/2005

*Primary Examiner* — Glenn F Myers
(74) *Attorney, Agent, or Firm* — Lempia Summerfield Katz LLC

(57) ABSTRACT

A mobility hub is composed of a plurality of layers and serves as a terminal of a ground mobility and an air mobility. The mobility hub includes: a ground layer provided with an entrance of the ground mobility; a port layer provided with a taking-off and landing site of the air mobility; and a middle layer provided between the ground layer and the port layer. The middle layer has the ground mobility elevating in a space with the ground layer, is provided with a plurality of connection slots to which the ground mobility is connected, and provides an activity space through the ground mobility if the ground mobility is coupled to the connection slot.

12 Claims, 4 Drawing Sheets

(56) References Cited

U.S. PATENT DOCUMENTS

| | | | |
|---|---|---|---|
| 2017/0175413 A1* | 6/2017 | Curlander | E04H 14/00 |
| 2020/0156807 A1* | 5/2020 | King | E04H 6/44 |
| 2020/0180940 A1* | 6/2020 | Rainville | B64D 37/04 |
| 2020/0349852 A1* | 11/2020 | DiCosola | G06Q 10/0832 |
| 2021/0087840 A1* | 3/2021 | Hu | E04H 6/22 |
| 2021/0197983 A1* | 7/2021 | Wang | B64D 1/18 |

* cited by examiner

MOBILITY HUB

CROSS REFERENCE TO RELATED APPLICATION

The present application claims priority to Korean Patent Application No. 10-2020-0132712 filed on Oct. 14, 2020, the entire contents of which are incorporated herein for all purposes by this reference.

BACKGROUND OF THE DISCLOSURE

Field of the Disclosure

The present disclosure relates to a mobility hub, in which a ground mobility enters and exits through a ground layer, the ground mobility may be coupled to a connection slot of a middle layer to form various activity spaces, and an air mobility takes off and lands at the taking-off and landing site alone or in combination with the ground mobility in a port layer.

Description of the Related Art

As used throughout this patent, the term "mobility" is intended to mean any moving vehicle, device, machine, instrument, apparatus, or the like. A mobility, as used herein, may thus include a vehicle operating or driving on the ground and an unmanned aerial vehicle, such as a drone, flying in the air. A future mobility is utilized as a means of transportation performing various functions and is currently being actively developed around an air mobility as well as a ground mobility. Further, the future mobility is being developed into a concept of the comprehensive mobility by getting out of the concept of each of the ground mobility and the air mobility to couple each mobility. A concept is also proposed in which each mobility is utilized as a space in which a passenger may engage in various activities within the mobility rather than being simply utilized as a means of transportation.

The foregoing explained as the background is intended merely to aid in the understanding of the background of the present disclosure. The foregoing is not intended to mean that the background falls within the purview of the related art that is already known to those having ordinary skill in the art.

SUMMARY OF THE DISCLOSURE

Therefore, there is a need for the development of a hub or the like in which: it is possible to overcome the temporal or spatial constraint of the mobility; the mobility is integrated into buildings in which residential activity or economic activity is currently conducted by incorporating the mobility into everyday life; the mobility may move to each place in various methods; the people may engage in various activities such as residential activity or economic activity through the mobility; and each mobility may be collectively managed by stopping at one complex place.

The present disclosure is proposed to solve the above problems. An object of the present disclosure is to provide a mobility hub composed of a plurality of layers in which a ground mobility enters and exits through a ground layer. The ground mobility may be coupled to a connection slot of a middle layer to form various activity spaces. The ground mobility may move between the respective layers through an elevating part penetrating and connecting the respective layers. An air mobility takes off and lands at a taking-off and landing site alone or in combination with the ground mobility in a port layer.

A mobility hub according to the present disclosure is provided for achieving the object. The mobility hub is composed of a plurality of layers and serves as a terminal of a ground mobility and an air mobility. The mobility hub includes: a ground layer provided with an entrance for the ground mobility; a port layer provided with a taking-off and landing site of the air mobility; and a middle layer provided between the ground layer and the port layer. The middle layer has the ground mobility elevating in a space with the ground layer, is provided with a plurality of connection slots to which the ground mobility is connected, and provides an activity space through the ground mobility if the ground mobility is coupled to the connection slot.

The middle layer may be composed of a plurality of layers, the ground layer may be provided on the lowermost end of the middle layer, and the port layer may be provided on the uppermost end of the middle layer.

An elevating part penetrates and connects the ground layer, the middle layer, and the port layer and may be provided inside the ground layer, the middle layer, and the port layer. The elevating part may move the ground mobility between the ground layer, the middle layer, and the port layer.

The air mobility may take off and land alone at the taking-off and landing site of the port layer or may take off and land in combination with the ground mobility disposed on the taking-off and landing site of the port layer.

The ground mobility may move from the ground layer to the port layer or from the middle layer to the port layer through the elevating part that penetrates and connects the ground layer, the middle layer, and the port layer, when taking off and landing in combination with the air mobility.

The middle layer may have each layer designated for a use, the connection slot of each layer may be coupled with the ground mobility suitable for the use of the corresponding layer, and the ground mobility may be provided with a necessary item suitable for the use of the coupled layer.

The middle layer may have each layer designated for a use including residential activity, economic activity, or leisure activity.

The middle layer may be provided with a charging layer provided with a charging facility. The ground mobility may exchange power or hydrogen with the charging layer through the charging facility when being coupled to the connection slot of the charging layer.

The taking-off and landing site of the port layer may be provided with a charging facility. The air mobility may exchange power or hydrogen with the taking-off and landing site through the charging facility when landing at the taking-off and landing site of the port layer.

A fixing part may be provided inside the connection slot of the middle layer. The fixing part may support or fix the outside of the ground mobility if the ground mobility is coupled to the connection slot.

The connection slot of the middle layer may be provided with a support part slid toward the outside of the connection slot. The support part may support the load of the ground mobility if the ground mobility is coupled to the connection slot.

The connection slot of the middle layer may be provided with a supply part. If the ground mobility is coupled to the connection slot, the supply part may be connected to the ground mobility and supply a resource such as hydrogen, water, gas, or power to the ground mobility.

The air mobility may enter and exit through the entrance of the ground layer and the air mobility may be elevated between the ground layer and the port layer through the middle layer.

According to the mobility hub of the present disclosure, the mobility hub is composed of the plurality of layers and is characterized in that: the ground mobility may enter and exit through the ground layer; the ground mobility may be coupled to the connection slot of the middle layer to form various activity spaces; the ground mobility may move between the respective layers through the elevating part that penetrates and connects the respective layers; and the air mobility may take off and land at the taking-off and landing site alone or in combination with the ground mobility in the port layer.

BRIEF DESCRIPTION OF THE DRAWINGS

The above and other objects, features, and other advantages of the present disclosure will be more clearly understood from the following detailed description when taken in conjunction with the accompanying drawings, in which.

DETAILED DESCRIPTION OF THE DISCLOSURE

Figure 1:
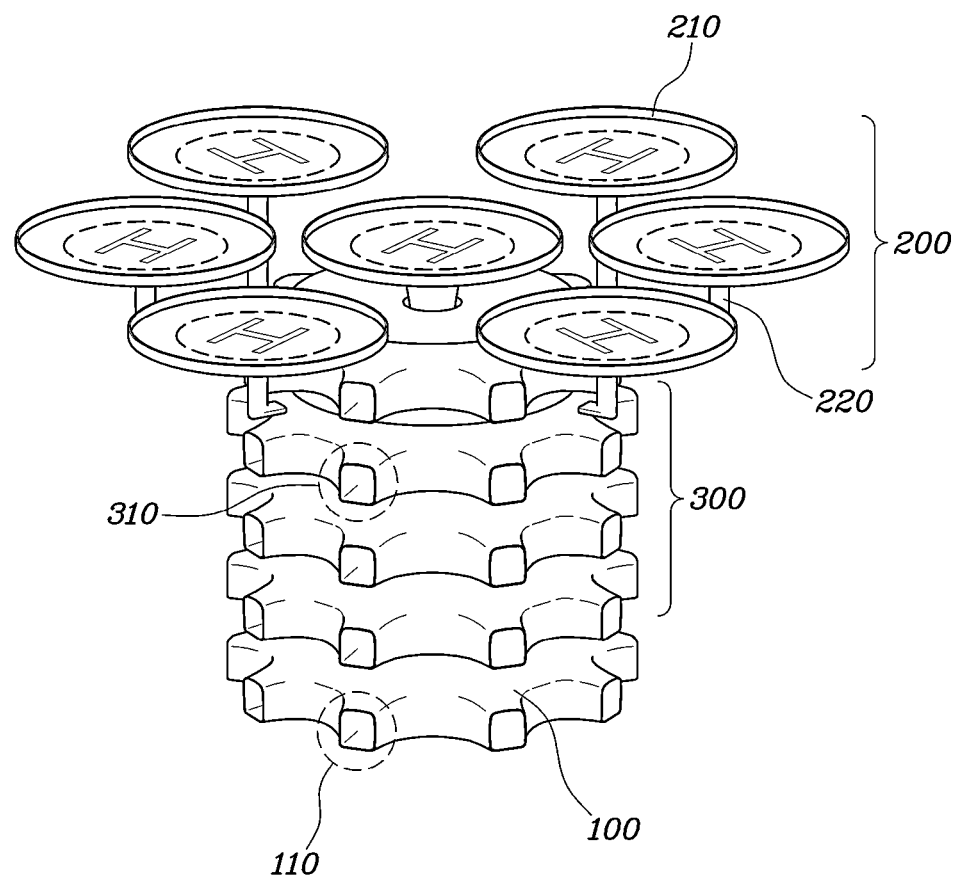
FIG. 1 is a diagram illustrating a mobility hub according to an embodiment of the present disclosure.
Figure 2:
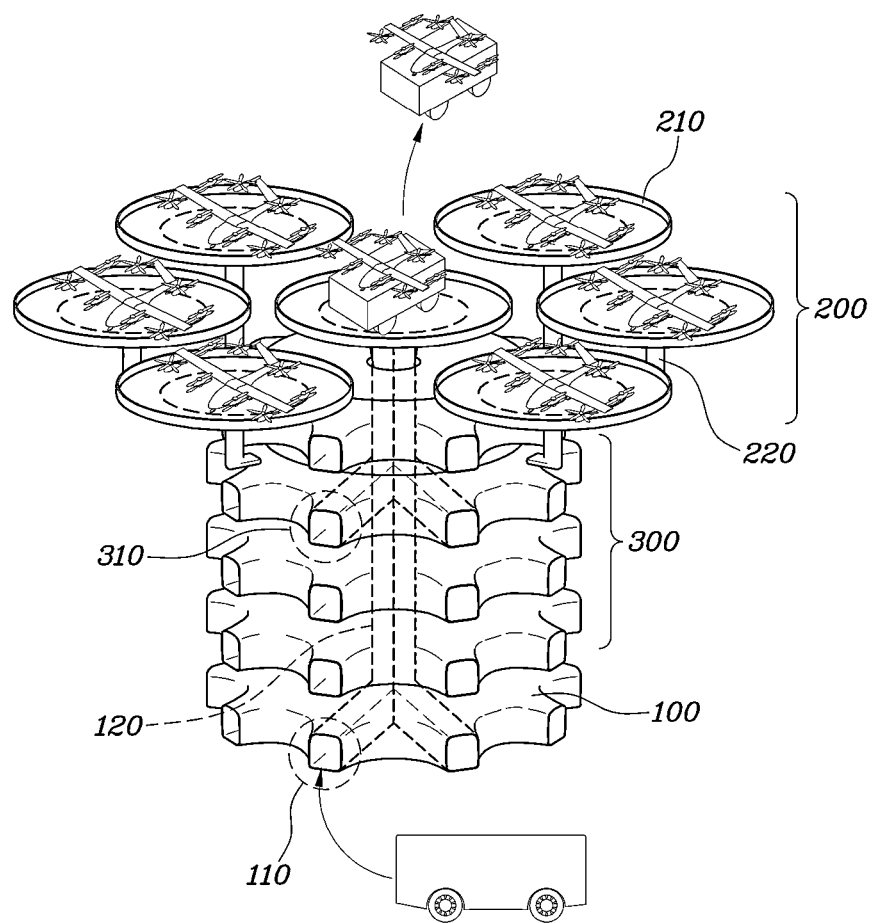
FIG. 2 is a diagram illustrating the inside of the mobility hub according to the embodiment of the present disclosure.
Figure 3:
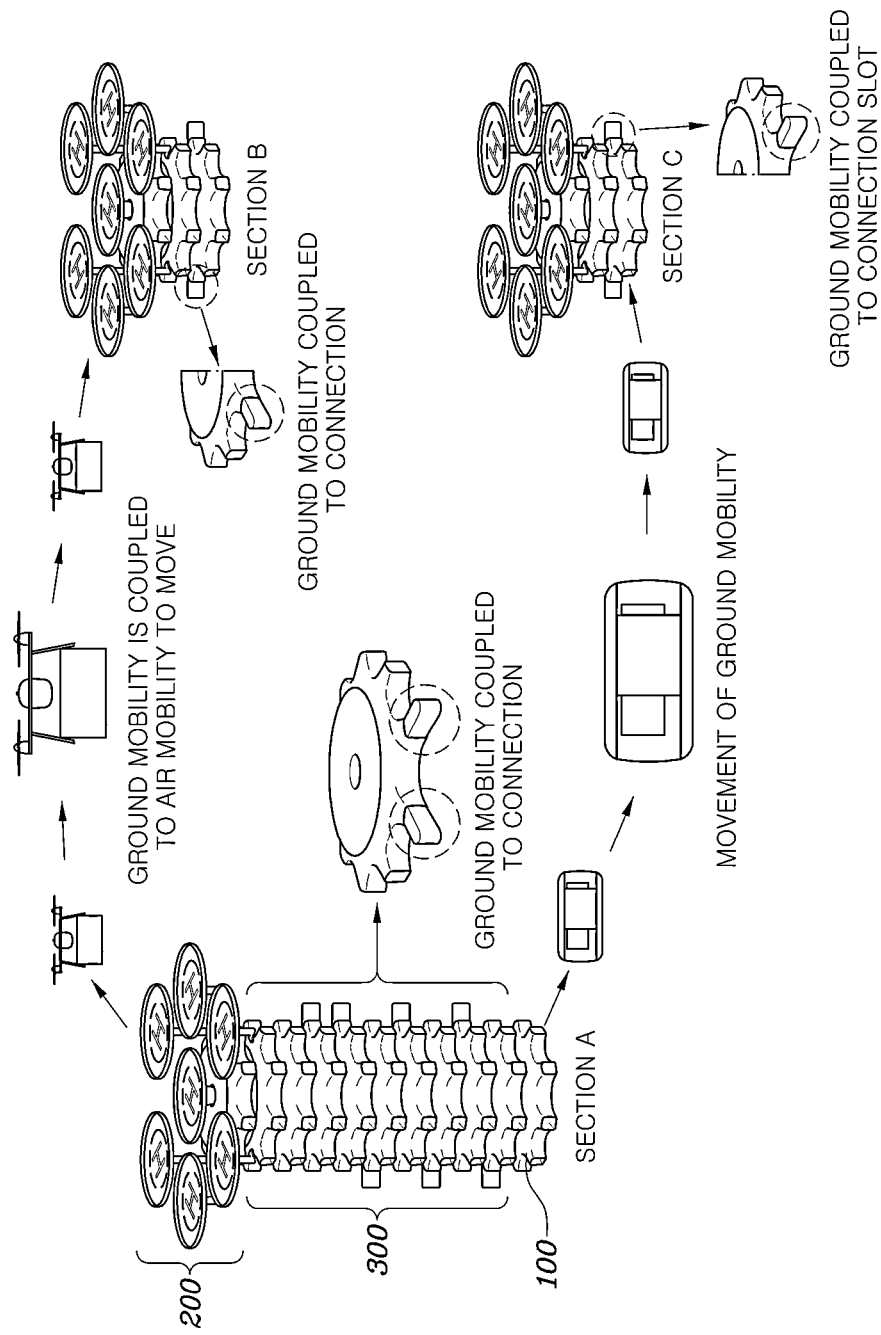
FIG. 3 is a diagram illustrating that the mobility hub according to the embodiment of the present disclosure is disposed in each region and the mobility moves between the regions.
Figure 4:
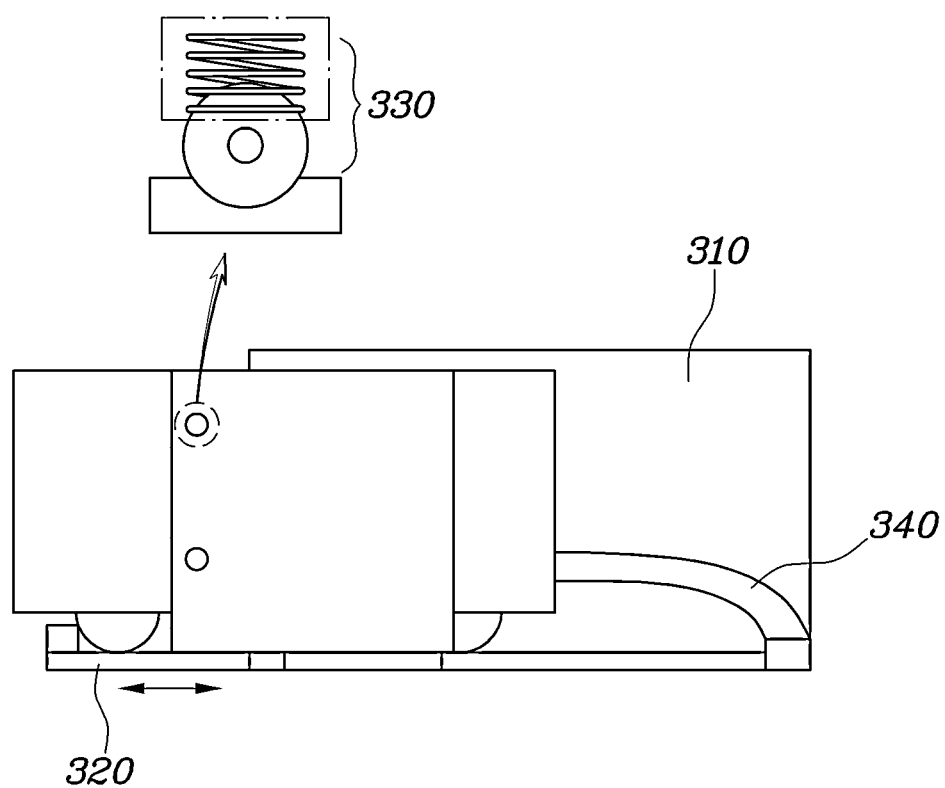
FIG. 4 is a diagram illustrating that a ground mobility is coupled to a connection slot in the mobility hub according to the embodiment of the present disclosure.

FIG. 1 is a diagram illustrating a mobility hub according to an embodiment of the present disclosure. FIG. 2 is a diagram illustrating the inside of the mobility hub according to the embodiment of the present disclosure. FIG. 3 is a diagram illustrating that the mobility hub according to the embodiment of the present disclosure is disposed in each region and the mobility moves between the regions. FIG. 4 is a diagram illustrating that a ground mobility is coupled to a connection slot in the mobility hub according to the embodiment of the present disclosure.

FIG. 1 is a diagram illustrating a mobility hub according to an embodiment of the present disclosure. FIG. 2 is a diagram illustrating the inside of the mobility hub according to the embodiment of the present disclosure. A mobility hub according to the embodiment of the present disclosure is composed of a plurality of layers, and serves as a terminal of a ground mobility and an air mobility. The mobility hub includes: a ground layer 100 provided with an entrance 110 for the ground mobility; a port layer 200 provided with a taking-off and landing site 210 for the air mobility; and a middle layer 300 provided between the ground layer 100 and the port layer. The middle layer 330 has the ground mobility elevating in a space with the ground layer 100, is provided with a plurality of connection slots 310 to which the ground mobility is connected, and provides an activity space through the ground mobility if the ground mobility is coupled to the connection slot 310. The middle layer 300 may be composed of a plurality of layers, the ground layer 100 may be provided on the lowermost end of the middle layer, and the port layer 200 may be provided on the uppermost end of the middle layer.

More specifically, the ground mobility is a purpose built vehicle and is capable of autonomous driving. Various items are provided inside the vehicle according to the purpose of the vehicle. A passenger may engage in various activities suitable for the purpose of the vehicle while inside the vehicle. This is a concept of utilizing the vehicle as the activity space in which the vehicle has a specific purpose such as a public transportation vehicle, a multi-purpose space, a medical space, a residential space, a pop-up store, a freight transport, and a wireless charging station. The passenger is engaged in various activities such as taking a rest, exercising, eating, working, or the like in the inner space of the vehicle while the vehicle moves, rather than simply utilizing the vehicle as a means of transportation.

Further, the air mobility is a concept of utilizing the air mobility such that the purpose built vehicle, i.e., the ground mobility, is coupled to the air mobility such that the air mobility flies together with the ground mobility. The passenger is engaged in various activities in the purpose built vehicle without having to transfer from the mobility to another separate mobility, instead simply utilizing the air mobility as a means of transportation through the flight of the air mobility itself.

The mobility hub according to the embodiment of the present disclosure serves as a complex mobility hub of the aforementioned ground mobility and air mobility. The ground layer 100 is located on the lowermost end of the hub to serve as the entrance 110 through which the ground mobility enters into the mobility hub on the ground. The port layer 200 is provided with a plurality of taking-off and landing sites 210 and the air mobility lands on any of the plurality of taking-off and landing sites 210. To avoid the noise of the air mobility and to simplify the taking-off and landing of the air mobility, the port layer 200 is located on the uppermost end of the mobility hub.

Referring to FIG. 2, an elevating part 120 penetrates and connects the ground layer 100, the middle layer 300, and the port layer 200 and is provided inside the ground layer 100, the middle layer 300, and the port layer 200. The elevating part 120 may move the ground mobility between the ground layer 100, the middle layer 300, and the port layer 200. The elevating part 120 serves as an elevator moving the ground mobility between the respective layers, such that the elevating part 120 is penetrating and connecting the entrance 110 of the ground layer 100, the connection slot 310 of the middle layer 300, or the taking-off and landing site 210 of the port layer 200. The elevating part 120 moves a support plate that supports the lower portion of the ground mobility if the ground mobility enters into the elevating part 120, such that the ground mobility moves between the respective layers or between the respective connection slots 310.

Further, the air mobility may take off and land alone at a taking-off and landing site 210 of the port layer 200 or may take off and land in combination with the ground mobility disposed on the taking-off and landing site 210 of the port layer 200. As described above, the air mobility is provided with a separate boarding part such that the passenger may board the air mobility, or the ground mobility may be coupled to the air mobility to move with the air mobility. If the ground mobility is coupled to the air mobility, the air mobility may also lift and move the ground mobility simply through a wire, a coupling device, or the like.

For example, the air mobility and the ground mobility may also be coupled to each other by controlling a wedge and a hook or a bolt and a nut provided in the air mobility and the ground mobility by a separate driving part to hook the wedge and the hook to couple the bolt and the nut. The air mobility and ground mobility may be coupled in various methods in which the air mobility has a sufficient coupling force for raising the ground mobility or preventing the vertical separation and horizontal separation from the ground mobility.

Meanwhile, when taking off and landing in combination with the air mobility, the ground mobility may move from the ground layer 100 to the port layer 200 or from the middle layer 300 to the port layer 200 through the elevating part 120 that penetrates and connects the ground layer 100, the middle layer 300, and the port layer 200. The elevating part 120 may be connected to the taking off and landing sites 210 of the port layer 200 to dispose the ground mobility on a taking-off and landing site 210. If the plurality of taking-off and landing sites 210 are provided in the port layer 200, the ground mobility may be disposed on one of the taking-off and landing sites 210 through a separate auxiliary elevating part 220 connected to the elevating part 120.

FIG. 3 is a diagram illustrating that the mobility hub according to the embodiment of the present disclosure is disposed in each region and the mobility moves between the regions. In the mobility hub according to the embodiment of the present disclosure, the middle layer 300 has each layer designated for a use. The connection slot 310 of each layer is coupled to the ground mobility suitable for the use of the corresponding layer. The ground mobility may be provided with a necessary item suitable for the use of the coupled layer. Further, the middle layer 300 may have each layer designated for a use including residential activity, economic activity, or leisure activity.

Specifically, the mobility hub according to the embodiment of the present disclosure may be provided in each region. When the existing building is a fixed space such as a residential space or an economic activity space, each moving ground mobility is replaced with a space capable of residential activity, economic activity, or the like, such that the mobility hub according to the embodiment of the present disclosure may be regarded as a space in which the passenger moves to each region as necessary through the ground mobility or the air mobility.

For example, referring to FIG. 3, if the passenger utilizing one ground mobility as a residential space exists, the passenger is coupled to the connection slot 310 of the middle layer 300 in the mobility hub located in a section C to reside in the section C. If the passenger moves to the mobility hub of a section A to which the ground mobility utilized as an office for work is coupled, the ground mobility is separated from the mobility hub of the section C to move to the mobility hub of the section A even if the passenger does not leave the residential space separately. The passenger may directly go to work to the ground mobility utilized as the office in the mobility hub of the section A. Further, even when the passenger is on a business trip or on vacation, the ground mobility itself moves to the mobility hubs of other regions such as a section B and a section C even if the passenger stays on the corresponding ground mobility. Thus, the passenger may be free from the temporal and spatial constraints when moving between the respective regions.

Further, when the space for each purpose for each floor in the existing building, for example, a cafe provided on the second floor, an office provided on the third floor, or the like, is provided, the mobility hub according to the embodiment of the present disclosure is provided with a flexible space of which the use may be changed at any time according to the ground mobility coupled for each layer or each connection slot. At this time, for the passenger's convenience, the middle layer 300 has each layer designated for a use. For example, the second floor may be configured as a residential layer, the third floor may be configured as an economic layer, the fourth floor may be configured as a leisure layer, or the like. The ground mobility coupled to the connection slot 310 of each layer is provided with an item according to each use.

Meanwhile, the middle layer 300 is provided with a charging layer provided with a charging facility. When the ground mobility is coupled to the connection slot 310 of the charging layer, the ground mobility may exchange power or hydrogen with the charging layer through the charging facility. Further, the taking-off and landing sites 210 of the port layer 200 are likewise provided with a charging facility. When landing at the taking-off and landing sites 210 of the port layer 200, the air mobility may exchange power or hydrogen with the taking-off and landing sites 210 through the charging facility. The ground mobility and the air mobility may be driven by using electrical or hydrogen energy and may be coupled to or land on the mobility hub. Thus, the ground mobility and the air mobility may be maintained and managed through the charging facility provided on each layer of the mobility hub without having to visit a separate place such as a separate or remote charging station.

FIG. 4 is a diagram illustrating that the ground mobility is coupled to the connection slot 310 in the mobility hub according to the embodiment of the present disclosure. In the mobility hub according to the embodiment of the present disclosure, a fixing part 330 is provided inside the connection slot 310 of the middle layer 300. The fixing part 330 may support or fix the outside of the ground mobility if the ground mobility is coupled to the connection slot 310. The fixing part 330 may be composed of a spring and a rotating bearing, which are provided on an inner wall of the connection slot 310, and in which the bearing may be supported by the ground mobility to be rotated. The fixing part 330 may be coupled to a fixing groove provided in the ground mobility, thereby preventing the ground mobility from being separated.

Further, the connection slot 310 of the middle layer 300 is provided with a support part 320 slid toward the outside of the connection slot 310. The support part 320 may support the load of the ground mobility if the ground mobility is coupled to the connection slot 310. The support part 320 may be provided on the lower end of the connection slot 310 to support and fix the load of the ground mobility coupled to the connection slot 310. The support part 320 may be slid in the forward and rearward directions of the connection slot 310 according to the weather conditions, such that the ground mobility may protrude to the outside of the mobility hub or be introduced into the mobility hub. There is an advantage in that it is possible to further expand and use the ground mobility and the space of the connection slot 310 if the ground mobility protrudes to the outside of the mobility hub.

Meanwhile, the connection slot 310 of the middle layer 300 is provided with a supply part 340. The supply part 340 is connected to the ground mobility if the ground mobility is coupled to the connection slot 310 and may supply a resource such as hydrogen, water, gas, or power to the ground mobility. The ground mobility is utilized as various living, work, or other use spaces rather than being simply utilized as a means of transportation. The ground mobility provides power, hydrogen, water, gas, or the like necessary for the passenger of the ground mobility to live, work, and act inside the ground mobility through the supply part 340.

The ground mobility is connected to the mobility hub to receive the items necessary for the living, work, or other activities such as being provided with a cable for the access to the Internet or a passage for disposing of waste items.

Further, the air mobility may enter and exit through the entrance 110 of the ground layer 100. The air mobility may be elevated between the ground layer 100 and the port layer 200 through the middle layer 300. More specifically, the air mobility may land at a taking-off and landing site 210 of the port layer 200 to move to the middle layer 300 or the ground layer 100 through the elevating part 120. The air mobility may also enter into the mobility hub through the entrance 110 of the ground layer 100 to move to the middle layer 300 through the elevating part 120 or take off at a taking-off and landing site 210 of the port layer 200, when landing on the ground to travel like the ground mobility.

The mobility hub according to the embodiment of the present disclosure replaces the role of an existing building. However, the use or location of each space located in the mobility hub may be flexibly changed out of the spatial constraint. Also, even when moving to a mobility hub located between the respective regions, the passenger lives or is engaged in various activities in the ground mobility while the ground mobility or the air mobility moves according to the necessary purpose. Thus, the passenger may escape from the temporal and spatial constraints of the simple movement.

While the specific embodiment of the present disclosure has been illustrated and described, it should be apparent to those having ordinary skill in the art that the present disclosure may be variously improved and changed without departing from the technical spirit of the present disclosure provided by the appended claims.

What is claimed is:

1. A mobility hub serves as a terminal of a ground mobility and an air mobility, the mobility hub comprising:
   a ground layer provided with an entrance for the ground mobility;
   a port layer provided with a taking-off and landing site for the air mobility; and
   a middle layer provided between the ground layer and the port layer, the middle layer having the ground mobility elevating in a space with the ground layer, provided with a plurality of connection slots to which the ground mobility may be connected, and providing an activity space through the ground mobility if the ground mobility is coupled to the connection slot,
   wherein a fixing part is provided inside the connection slot of the middle layer, and wherein the fixing part is operable to fix the ground mobility to the connection slot.

2. The mobility hub according to claim 1,
wherein the middle layer is composed of a plurality of layers, the ground layer is provided on a lowermost end of the middle layer, and the port layer is provided on an uppermost end of the middle layer.

3. The mobility hub according to claim 1,
wherein an elevating part penetrates and connects the ground layer, the middle layer, and the port layer and is provided inside the ground layer, the middle layer, and the port layer, and the elevating part moves the ground mobility between the ground layer, the middle layer, and the port layer.

4. The mobility hub according to claim 1,
wherein the air mobility can take off and land alone at the taking-off and landing site of the port layer, or can take off and land in combination with the ground mobility disposed on the taking-off and landing site of the port layer.

5. The mobility hub according to claim 4,
wherein the ground mobility moves from the ground layer to the port layer or from the middle layer to the port layer through an elevating part that penetrates and connects the ground layer, the middle layer, and the port layer, when taking off and landing in combination with the air mobility.

6. The mobility hub according to claim 1,
wherein the middle layer has one or more layers each designated for a use, the connection slot of each of the one or more layers is coupled with the ground mobility suitable for the use of the corresponding layer, and the ground mobility is provided with a necessary item suitable for the use of the coupled layer.

7. The mobility hub according to claim 6,
wherein the middle layer has each of the one or more layers designated for a use including residential activity, economic activity, or leisure activity.

8. The mobility hub according to claim 1,
wherein the middle layer is provided with a charging layer provided with a charging facility, and wherein the ground mobility exchanges power or hydrogen with the charging layer through the charging facility when being coupled to the connection slot of the charging layer.

9. The mobility hub according to claim 1,
wherein the taking-off and landing site of the port layer is provided with a charging facility, and wherein the air mobility exchanges power or hydrogen with the taking-off and landing site through the charging facility when landing at the taking-off and landing site of the port layer.

10. The mobility hub according to claim 1,
wherein the connection slot of the middle layer is provided with a support part slid toward an outside of the connection slot, and wherein the support part supports a load of the ground mobility if the ground mobility is coupled to the connection slot.

11. The mobility hub according to claim 1,
wherein the connection slot of the middle layer is provided with a supply part, and, if the ground mobility is coupled to the connection slot, the supply part is connected to the ground mobility and supplies a resource comprising hydrogen, water, gas, or power to the ground mobility.

12. The mobility hub according to claim 1,
wherein the air mobility enters and exits through the entrance of the ground layer, and wherein the air mobility is elevated between the ground layer and the port layer through the middle layer.

* * * * *